Sept. 17, 1935.  M. T. LOTHROP  2,014,854
CONTROL FOR MOTOR VEHICLES
Filed July 12, 1934  2 Sheets-Sheet 1

INVENTOR
Marcus T. Lothrop
BY
Evans + McCoy
HIS ATTORNEYS

Sept. 17, 1935.                    M. T. LOTHROP                    2,014,854
                              CONTROL FOR MOTOR VEHICLES
                      Filed July 12, 1934              2 Sheets-Sheet 2
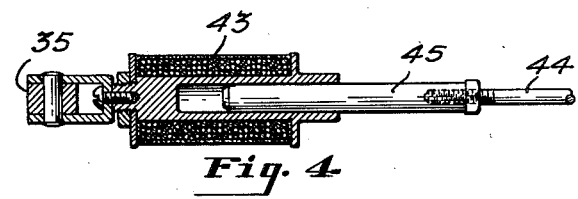
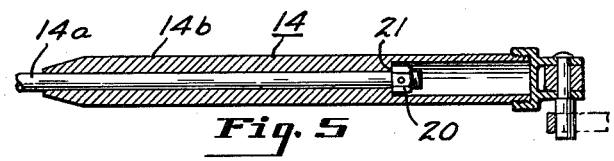
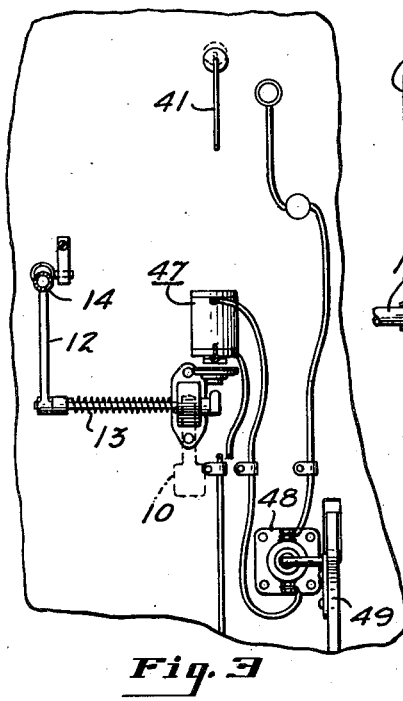
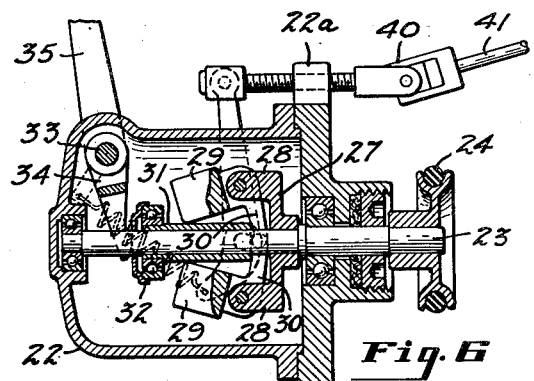
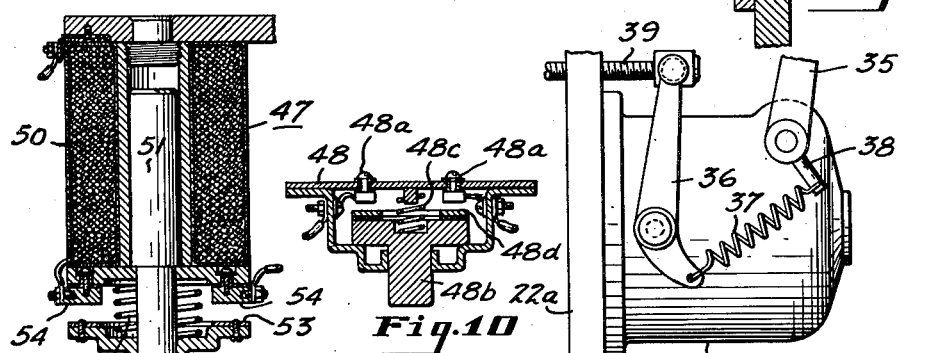
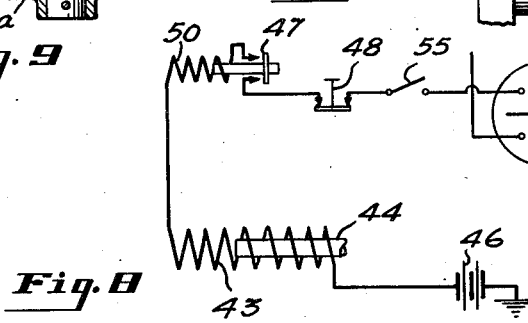
INVENTOR
Marcus T. Lothrop
BY
Evans & McCoy
HIS ATTORNEYS Patented Sept. 17, 1935

2,014,854

UNITED STATES PATENT OFFICE 2,014,854

CONTROL FOR MOTOR VEHICLES

Marcus T. Lothrop, Canton, Ohio; Margaret F. Lothrop executrix of said Marcus T. Lothrop, deceased Application July 12, 1934, Serial No. 734,816

20 Claims. (Cl. 192—3)

This invention relates to the control of motor vehicles, and more particularly to apparatus for controlling the supply of fuel to the engines thereof.

The conventional fuel control for motor vehicles includes a hand throttle and a foot throttle or accelerator, either of which is manually actuated to operate the throttle valve of the engine carburetor for increasing or decreasing the supply of fuel to the engine. In vehicles of present day design, the hand throttle is so located that it is inconvenient to use the same as a fuel control under driving conditions, thus making it necessary to use the foot accelerator for driving.

The driver of a motor vehicle often, when the condition of the highway permits and especially when driving long distances, wishes to maintain a practically constant speed, but in order for him to do so, it is necessary to continually watch the speedometer and to continually exert the proper foot pressure on the accelerator. It is very tiresome for many drivers, when driving long distances, to always keep one foot in the single position necessary for actuating the foot accelerator.

The primary object of the present invention is to provide a motor vehicle with a new and improved fuel control which, when in operation, keeps the motor vehicle running at a practically constant speed of travel regardless of road or load conditions, and which actually assists the driver by relieving him of the necessity of paying attention to the vehicle or engine speed and actuating the manual fuel control, thus making it much easier and less tiresome for the driver to operate the vehicle.

Another object is to provide an apparatus for controlling the supply of fuel to a motor vehicle engine, which, at the will of the driver, may be rendered operative to automatically maintain a practically constant and predetermined speed of travel regardless of road or load conditions, by automatically increasing the supply of fuel should the road or load conditions demand such an increase in order to maintain the predetermined speed.

Another object is to provide an apparatus of the above nature which will not interfere with the manual acceleration of the vehicle above the predetermined speed, which functions without any sacrifice in the safety of operation of the vehicle and which may be rendered inoperative at the will of the driver.

A further object is to provide a simple and economical, automatic fuel control device for motor vehicles which automatically functions under demands of the engine for an additional or a diminished supply of fuel, due to changes in road or load conditions, in order to maintain a practically constant speed, to increase or decrease the fuel supply, and to relieve the driver of the necessity of manually operating the controls ordinarily provided for this purpose.

With the above and other objects in view, the present invention consists in certain features of construction and combinations of parts to be hereinafter described with reference to the accompanying drawings, and then claimed.

In the drawings, which illustrate a suitable embodiment of the invention,

Fig. 3 is a section taken approximately on the line 3—3 of Fig. 1;

Fig. 4 is a longitudinal section taken approximately on the line 4—4 of Fig. 1;

Fig. 5 is a longitudinal section taken approximately on the line 5—5 of Fig. 1, showing the connection between the foot accelerator and the throttle valve of the carburetor;

Fig. 6 is a vertical section taken through the automatic speed regulator;

Fig. 7 is a side elevation of the device shown in Fig. 6, showing the means for adjusting the speed regulator;

Fig. 8 is a wiring diagram of the electrical system used for making the connection between the throttle and speed regulator;

Fig. 9 is a longitudinal section taken through one of the switches used in controlling the apparatus; and Fig. 10 is a section taken through another of the switches used in controlling the apparatus.

Briefly stated, the invention resides in a new and improved control for motor vehicles, which enables the driver at his will to select a predetermined speed and regardless of road or load conditions, to maintain the speed practically constant without effort on his part, and without the manual operation of conventional controls while retaining safe control of the vehicle at all times. The apparatus is arranged so that the vehicle may be manually accelerated above the predetermined speed should this be necessary, and also so that it may be instantly thrown out of operation to permit the driving of the vehicle with the conventional controls.

The control apparatus includes, as will be more fully described in detail, an automatic speed regulator which is connected with the throttle valve and which operates at or in relation to the speed of the engine. This speed regulator functions below any selected predetermined speed independently of the foot accelerator, to open the throttle for increasing the supply of fuel whenever the road or load conditions demand an increase in fuel to maintain the predetermined speed, and to limit the supply of fuel to the amount necessary for that speed.

Referring to the accompanying drawings, in which like numerals refer to like parts throughout the several views, I have shown one embodiment which is to be considered illustrative only of one manner in which the invention may be practiced.

Figure 1:
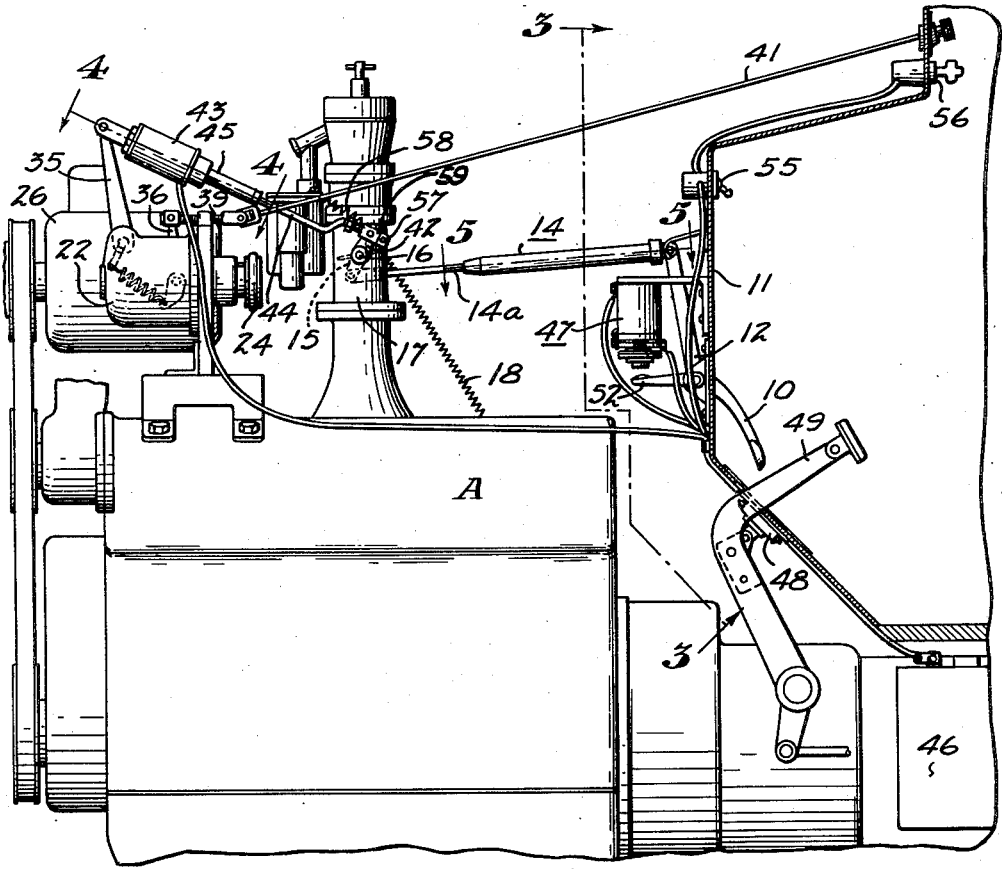
Figure 1 is a side view, partially diagrammatic, showing the fuel control apparatus in association with an engine.
Figure 2:
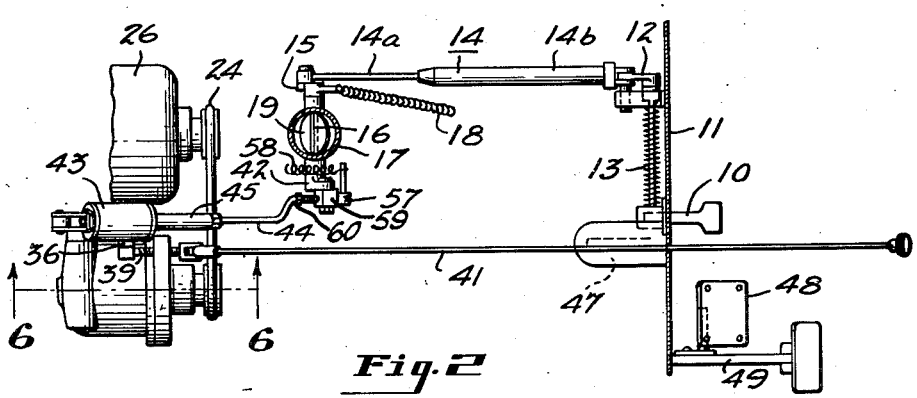
Fig. 2 is a plan view showing the arrangement of the fuel control apparatus illustrated in Fig. 1.

Referring to Figs. 1 and 2, the conventional accelerator control includes a foot pedal 10 pivotally mounted on the motor vehicle dash 11 or other convenient location and which actuates a swingable arm 12, a torsion spring 13 being employed to hold the pedal 10 in its normal position, i. e. idling position. The free end of the arm 12 is connected by a link 14 with a throttle lever 15 secured to the throttle shaft 16 of the carburetor 17, a spring 18 being employed in the construction shown in association with the lever 15 to yieldably urge the butterfly valve 19 of the carburetor to its closed or idling position. The link 14 preferably is formed of two parts, namely, a rod part 14a pivoted to the throttle lever 15 and having a head or nut 20, and a counterbored sleeve part 14b pivoted to the accelerator arm 12 and having an internal shoulder 21 for engagement with the nut 20. This provides a connection which, when the accelerator pedal 10 is depressed, actuates the throttle through engagement of the nut 20 with the shoulder 21 and also a connection which permits the throttle to be opened independently of the foot pedal 10, in which case the rod part 14a will move relative to the part 14b. It is to be clearly understood, however, that other means may be provided for obtaining relative movement between the throttle lever 15 and the accelerator pedal 10 when the throttle is to be actuated independently by the automatic control apparatus, as will be hereinafter described. In fact, the connection between the pedal 10 and throttle lever 15 may be rigid if there is no objection to actuating the foot pedal through the butterfly valve shaft 16 during the operation of the automatic control device, but I have found that because of friction and the resistance of the accelerator spring 13 in a rigid hookup, better operation is possible with the connection described.

The throttle or butterfly valve 19 is arranged to be automatically operated independently of the accelerator pedal 10 from a control device which operates at or in relation to the speed of the engine, such as an automatic speed regulator, and is arranged to be connected at the will of the driver with this regulator.

The speed regulator may be of any suitable type, but for the purpose of illustration I have shown and described a governor of the centrifugal "fly-ball" type.

The governor shown includes a casing 22 secured in any suitable manner to the engine A (diagrammatically illustrated), and having a shaft 23 journalled therein, which is driven by the engine. The governor, however, may form an integral part of the cylinder block or other part of the engine.

For the convenience of illustration, I have shown the shaft 23 as being driven by a belt 24 from the generator 26. The governor further includes a spider 27 rigidly mounted on the shaft 23 within the casing 22 and having opposed arms 28 on which the fly balls or weights 29 are pivoted. These weights are provided with arms 30 engaged with one end of a sleeve 31 which is slidably disposed on the shaft 23, the opposite end of the sleeve being provided with a suitable rotatably mounted thrust member 32. Journalled in the casing is a rock shaft 33 having at one end within the casing, a lever 34 engageable with the thrust member 32, and at its opposite end externally of the casing an upwardly extending lever 35.

Also, pivotally mounted on but externally of the casing 22 is a lever 36, the lower end of which is connected by a tension spring 37 with a part 38 extending from and below the pivotal axis of the lever 35. The tension spring 37 maintains the lever 34 in engagement with the thrust member 32 and resiliently opposes the tendency of the weights 29 to swing outwardly during rotation of the shaft 23, permitting a balanced condition of the weights 29 and springs 37 to obtain, thereby predetermining the position of the lever 35. The tension spring 37 is adjusted by a screw 39 rotatably engaged with the upper end of the lever 34 and threadably carried by the bracket 22a to which the casing 22 is secured. This screw is connected by a joint 40 with a rod 41 which preferably extends through the vehicle dash 11, so as to permit the driver to conveniently adjust the governor for the desired predetermined speed from the driver's compartment of the vehicle.

The governor actuated lever 35, when the apparatus is rendered operative at the will of the driver, actuates a throttle lever 42 mounted on the butterfly shaft 16, through a suitable breakable connection which may be of a mechanical or electrical type. Illustrative of one type of connection, I have shown in the drawings a solenoid 43 pivoted to the lever 35 and a rod 44 having a slidable connection at one end with the throttle lever 42 and having at its opposite end an armature 45 arranged to be actuated by the solenoid 43.

Referring to Figures 1 and 2, the throttle lever 42 is provided with a pivoted block 59 having an aperture through which the end of the rod slidably projects. The projecting end of the rod 44 is provided with a head 57 to normally abut against the block 59 a spring 58 being provided to urge the head 57 towards the block 59. The end of the rod 44 is threaded and provided with a nut 60 which acts as a stop when the throttle lever 42 is moved independently of the rod 44, such as when the speed is increased manually by the accelerator above the predetermined speed which is maintained by the regulator.

The solenoid 43 is in circuit with the vehicle battery 46, or any other suitable source of electrical energy, and is controlled by one or more suitable switches which may be arranged as desired. One suitable control is to provide a normally open switch 47 for closing the circuit and which is arranged to be closed by the accelerator pedal 10 when the pedal is moved a predetermined distance, such as to wide open throttle position, and a normally closed switch 48 for opening the circuit and which is opened upon movement of the brake pedal 49. The switch 47 includes a solenoid 50 in the switch circuit and an armature 51 which is moved by an arm 52 connected with the accelerator pedal 10. The armature 51 is provided with a conductor plate 53 for bridging the switch contacts 54, one of the contacts 54 being connected with the solenoid 50 and the other being in the circuit for the solenoid 43. The armature 51 is actuated by depressing the foot pedal 10 and causes the conductor plate 53 to bridge the contacts 54 and close the circuit. The closing of the circuit energizes the solenoid 50 and the solenoid 50 then acts as a holding coil to maintain the switch 47 closed after the pressure on the accelerator pedal is removed. Upon the opening of the circuit by the switch 48 through operation of the brake pedal 49, the solenoid 50 is de-energized and the armature 51 then, through the action of a compression spring 51a, assumes its normal position, thus opening the switch 47. It is to be understood that the switch 47 may be of any other suitable type and that the same may be opened by mechanical or other means.

The switch 48 preferably is of a type which remains closed as long as the brake pedal 49 is in its retracted inoperative position, but which is opened immediately upon initial movement of the brake pedal 49. The switch 48 may be of the type shown in Fig. 10, which includes a pair of spaced contacts 48a and a slidable member 48b urged away from the contacts 48a by means of a spring 48c, and having a conductor plate 48d for bridging the contacts 48a when the same is moved against the pressure of the spring 48c.

In order to provide a further control for the solenoid 43, a manually operated cut-out switch 55 may be included in the circuit and also the circuit may include the ignition switch 56 to prevent energization of the solenoid 43 when the engine is not in operation.

Assuming that the engine is not in operation, the throttle of butterfly 19 is approximately in the position indicated in Fig. 1 (i. e., idling position), the spring 18 holding the same in this position. The solenoid control switch 47 is opened and the connection between the governor actuated lever 35 and the throttle lever 42 is broken, and also the stop 57 at the end of the rod 44 is held by the tension spring 58 in engagement with the block 59 on the throttle lever 42.

Assuming that the vehicle is to be driven through the use of conventional controls, the ignition switch 56 is turned on and the engine placed in operation. By opening the manual switch 55, insurance is had that the automatic control device will not operate and the supply of fuel is then made solely dependent on the operation of the foot accelerator pedal 10. When the foot pressure on the accelerator pedal 10 is decreased or removed, the pedal 10 is moved back to its normal position by the torsion spring 13, and the coil spring 18 moves the throttle valve to its idling position.

If, during the conventional operation of the vehicle, the driver wishes to maintain a practically constant speed without the use of the conventional controls, he closes the switch 55 if the same has been opened during the conventional operation of the vehicle, and depresses the accelerator pedal 10 to wide open position, which closes the switch 47, and thereby completes the energizing circuit for the solenoid 43. The solenoid 43, upon energization, then moves the armature 45 and rod 44 to the left as viewed in Fig 1, thus connecting the governor actuated lever 35 and throttle lever 42, the spring 58 acting to overcome the gravity of the rod 44 and armature 45 and the friction of the armature. The pressure on the foot pedal 10 is removed immediately upon closing of the switch 47 and the spring 18 then causes the throttle lever 42 to assume an open throttle position, which position is determined by the position of the governor lever 35. The vehicle, should it be traveling, at the time the control device is thrown into operation, at a speed less than the predetermined speed, will then accelerate up to the predetermined speed. Now, should road or engine conditions tend to cause the vehicle to slow down, the speed of the governor will decrease and the control spring 37 then moves the lever 35 to the left, as viewed in Fig. 1, which opens the throttle and increases the supply of combustible mixture. As the speed of the vehicle increases through this supply of additional combustible mixture, the governor, through the lever, then actuates the throttle to decrease the supply of mixture to the engine, the position of the throttle, as previously described, being determined by the balanced condition of the control spring 37 and weights 29 of the governor. If, while the vehicle is traveling at a predetermined speed, it is desired to increase or decrease this predetermined speed, the control rod 39 is rotated to change the tension of the control spring 37, allowing the lever 35 to have a greater or lesser travel, as the case may be.

If, during the travel of the vehicle under the automatically controlled constant speed, it is desired to accelerate as when passing another vehicle, the accelerator pedal 10 may be depressed and the throttle valve opened manually beyond the position which is determined by the position of the governor lever 35, the throttle lever 42 sliding on the rod 44 to permit the increased opening of the throttle. When the foot pressure is removed, the spring 18 returns the throttle lever to the throttle position, determined by the position of the governor actuated lever 35.

Should it be desired to slow down from the predetermined speed, as in conventional driving, the brake pedal 49 is depressed and immediately the switch 48 opens the control circuit for the solenoid 43 which instantly breaks the connection between the governor lever 35 and throttle lever 42, the spring 18 returning the throttle valve to its idling position and making the supply of fuel again dependent upon the foot accelerator 10. The fuel control device may then be placed under the control of the governor by again closing the switch 47 through actuation of the accelerator pedal 10 in a manner previously described.

The advantages of the fuel control apparatus described are readily apparent. The combination of the automatic and conventional controls provides a motor vehicle control which is under control of the driver at all times and one which materially assists the driver of the vehicle by relieving him of the necessity of paying attention to the matter of engine speed at the desired cruising speed, and yet insuring that a constant predetermined speed will be maintained regardless of road or load conditions.

In using the apparatus under constant speed conditions, the driver is not constrained to keeping one foot on the accelerator and may shift his position and more or less relax, thus requiring less effort and making it more comfortable for him to drive than has been possible heretofore.

While I have shown specific connections and devices in order to show the application of the invention to a motor vehicle, it is to be clearly understood that various changes may be made in these connections and devices without departing from the spirit and scope of the invention as defined in the appended claims. For example, the automatic speed regulator may be of any suitable type, a mechanical connection between the speed regulator and throttle may be substituted for the electrical or solenoid operated connection described, and also in the electrical connection just described, other control circuits and types of control switches or mechanical devices may be substituted for the control switches described.

What I claim is:

1. In a motor vehicle having an engine and a throttle for controlling the fuel supply of the engine, a control connected with the throttle and operable by the driver of the vehicle, and an automatic control dependent on the speed of the engine for causing the fuel supply to be sufficient under varying load conditions for substantially maintaining a predetermined speed, said automatic control including an automatic speed regulator, means for driving said regulator from the engine, and means operative during operation of the vehicle for connecting said regulator with said throttle to render the fuel supply at speeds up to the predetermined speed dependent upon the speed regulator.

2. In a motor vehicle having an engine and a throttle for controlling the fuel supply of the engine, a control connected with said throttle and operable by the driver of the vehicle and an automatic control dependent on the speed of the engine for causing the fuel supply to be sufficient under varying load conditions for substantially maintaining a predetermined speed, said automatic control including an automatic speed regulator, means for driving said regulator from the engine, and means operative during operation of the vehicle for connecting said regulator with said throttle to render the fuel supply at speeds up to the predetermined speed dependent upon the speed regulator, said first control being operative independently of the automatic control at speeds above the predetermined speed to increase the fuel supply whereby to accelerate the vehicle.

3. In a motor vehicle having an engine and a throttle for controlling the fuel supply of the engine, a control connected with said throttle and operable by the driver of the vehicle and an automatic control dependent on the speed of the engine for causing the fuel supply to be sufficient under varying load conditions for substantially maintaining a predetermined speed, said automatic control including an automatic speed regulator, means for driving said regulator from the engine, and means operative during operation of the vehicle for connecting said regulator with said throttle to render the fuel supply at speeds up to the predetermined speed dependent upon the speed regulator, said automatic control including means operative during operation of the vehicle for disconnecting said regulator and throttle whereby to render the fuel supply dependent at all speeds on the first mentioned control.

4. In a motor vehicle having an engine and a throttle for controlling the fuel supply of the engine, a control connected with said throttle and operable by the driver of the vehicle, and an automatic control dependent on the speed of the engine for causing the fuel supply to be sufficient under varying load conditions for substantially maintaining a predetermined speed, said automatic control including an automatic speed regulator, means for driving said regulator from the engine, and means operative during operation of the vehicle for connecting said regulator with said throttle to render the fuel supply at speeds up to the predetermined speed dependent upon the speed regulator, said first mentioned control being operative independently of the automatic control at speeds above the predetermined speed to increase the fuel supply whereby to accelerate the vehicle, said automatic control including means operative during operation of the vehicle for disconnecting said regulator and throttle whereby to render the fuel supply dependent at all speeds on said first mentioned control.

5. In a motor vehicle having an engine and a throttle for controlling the fuel supply of the engine, a control connected with said throttle and operable by the driver of the vehicle and an automatic control dependent on the speed of the engine for causing the fuel supply to be sufficient under varying load conditions for substantially maintaining a predetermined speed, said automatic control including an automatic speed regulator, means for driving said regulator from the engine, a releasable connector having cooperable parts connected with said regulator and throttle, means associated with said connector and operative during operation of the vehicle for connecting said parts to render the fuel supply at speeds up to the predetermined speed dependent upon said automatic control, and means operative during operation of the vehicle to disconnect said parts, whereby to render the fuel supply dependent at all speeds on said first mentioned control.

6. In a motor vehicle having an engine and a throttle for controlling the fuel supply of the engine, a control connected with said throttle and operable by the driver of the vehicle and an automatic control dependent on the speed of the engine for causing the fuel supply to be sufficient under varying load conditions for substantially maintaining a predetermined speed, said automatic control including an automatic speed regulator, means for driving said regulator from the engine, cooperable parts connected with said throttle and regulator, electrical means for connecting said parts to render the fuel supply dependent at speeds at or below the predetermined speed upon said automatic control, and means operative during the operation of the vehicle for disconnecting said parts.

7. In a motor vehicle having an engine and a throttle for controlling the fuel supply of the engine, a control connected with the throttle and operable by the driver of the vehicle, and an automatic control dependent on the speed of the engine for causing the fuel supply to be sufficient under varying load conditions for substantially maintaining a predetermined speed, said automatic control including an automatic speed regulator, means for driving said regulator from the engine, cooperable parts connected with said throttle and regulator, one of said parts including a magnet device and the other of said parts including an armature arranged to be actuated by said magnet device, an electric circuit for energizing said magnet device whereby to connect said parts to render the fuel supply dependent at speeds at or below the predetermined speed upon said automatic control, a switch in said circuit, and means for opening said switch whereby to open said circuit to deenergize said magnet device and disconnect said parts.

8. In a motor vehicle having an engine and a throttle for controlling the fuel supply of the engine, a control connected with said throttle and operable by the driver of the vehicle, and an automatic control dependent on the speed of the engine for causing the fuel supply to be sufficient under varying load conditions for substantially maintaining a predetermined speed, said automatic control including an automatic speed regulator, means for driving said regulator from the engine, and means operative during operation of the vehicle for connecting said regulator with said throttle to render the fuel supply at speeds up to the predetermined speed dependent upon the speed regulator, said automatic control including means operative during operation of the vehicle for disconnecting said regulator and throttle whereby to render the fuel supply dependent at all speeds on the first mentioned control, said vehicle having a brake pedal, and said last named means being disposed to be operated by said brake pedal.

9. In a motor vehicle having an engine and a throttle for controlling the fuel supply of the engine, a control connected with the throttle and operable by the driver of the vehicle, and an automatic control dependent on the speed of the engine for causing the fuel supply to be sufficient under varying load conditions for substantially maintaining a predetermined speed, said automatic control including an automatic speed regulator, means for driving said regulator from the engine, and means operative during operation of the vehicle for connecting said regulator with said throttle to render the fuel supply at speeds up to the predetermined speed dependent upon the speed regulator, said last mentioned means being disposed to be operated by said first mentioned control.

10. In a motor vehicle having an engine and a throttle for controlling the fuel supply of the engine, a control connected with said throttle and operable by the driver of the vehicle, and an automatic control dependent on the speed of the engine for causing the fuel supply to be sufficient under varying load conditions for substantially maintaining a predetermined speed, said automatic control including an automatic speed regulator, means for driving said regulator from the engine, and means operative during operation of the vehicle for connecting said regulator with said throttle to render the fuel supply at speeds up to the predetermined speed dependent upon the speed regulator, said automatic control including means operative during operation of the vehicle for disconnecting said regulator and throttle whereby to render the fuel supply dependent at all speeds on the first mentioned control, said connecting means being disposed to be operated by said first mentioned control, said vehicle including a brake pedal and said disconnecting means being disposed to be operated by said brake pedal.

11. In a motor vehicle having an engine and a throttle for controlling the fuel supply of the engine, a control connected with said throttle and operable by the driver of the vehicle, and an automatic control dependent on the speed of the engine for causing the fuel supply to be sufficient under varying load conditions for substantially maintaining a predetermined speed, said automatic control including an automatic speed regulator, means for driving said regulator from the engine, cooperable parts connected with said throttle and regulator, electrical means for connecting said parts to render the fuel supply dependent at speeds at or below the predetermined speed upon said automatic control, and means operative during the operation of the vehicle for disconnecting said parts, said vehicle including a brake pedal, said last mentioned means being disposed to be actuated by said brake pedal.

12. In a motor vehicle having an engine and a throttle for controlling the fuel supply of the engine, a control connected with the throttle and operable by the driver of the vehicle, and an automatic control dependent on the speed of the engine for causing the fuel supply to be sufficient under varying load conditions for substantially maintaining a predetermined speed, said automatic control including an automatic speed regulator, means for driving said regulator from the engine, cooperable parts connected with said throttle and regulator, said parts including a solenoid and an armature, an electrical circuit for said solenoid, a magnetic switch in said circuit, and means for closing said switch.

13. In a motor vehicle having an engine and a throttle for controlling the fuel supply of the engine, a control connected with the throttle and operable by the driver of the vehicle, and an automatic control dependent on the speed of the engine for causing the fuel supply to be sufficient under varying load conditions for substantially maintaining a predetermined speed, said automatic control including an automatic speed regulator, means for driving said regulator from the engine, cooperable parts connected with said throttle and regulator, said parts including a solenoid and an armature, an electrical circuit for said solenoid, a magnetic switch in said circuit, and a second switch for opening said circuit.

14. In a motor vehicle having an engine and a throttle for controlling the fuel supply of the engine, a control connected with the throttle and operable by the driver of the vehicle, and an automatic control dependent on the speed of the engine for causing the fuel supply to be sufficient under varying load conditions for substantially maintaining a predetermined speed, said automatic control including an automatic speed regulator, means for driving said regulator from the engine, cooperable parts connected with said throttle and regulator, said parts including a solenoid and an armature, an electrical circuit for said solenoid, a magnetic switch in said circuit, said vehicle including a brake pedal, and a second switch in said circuit operable by said brake pedal for opening said circuit.

15. In a motor vehicle having an engine and a throttle for controlling the fuel supply of the engine, a control connected with the throttle and operable by the driver of the vehicle, and an automatic control dependent on the speed of the engine for causing the fuel supply to be sufficient under varying load conditions for substantially maintaining a predetermined speed, said automatic control including an automatic speed regulator, means for driving said regulator from the engine, cooperable parts connected with said throttle and regulator, said parts including a solenoid and an armature, an electrical circuit for said solenoid, a magnetic switch in said circuit, said vehicle including a brake pedal, and a second switch in said circuit operable by said brake pedal for opening said circuit, said magnetic switch being disposed to be closed by said first mentioned control.

16. In a motor vehicle having an engine and a throttle for controlling the fuel supply of the engine, a control connected with the throttle and operable by the driver of the vehicle, and an automatic control dependent on the speed of the engine for causing the fuel supply to be sufficient under varying load conditions for substantially maintaining a predetermined speed, said automatic control including an automatic speed regulator, means for driving said regulator from the engine, means for adjusting said speed regulator whereby to adjust the same for a different predetermined speed, and means operative during operation of the vehicle for connecting said regulator with said throttle to render the fuel supply at speeds up to the predetermined speed dependent upon the speed regulator.

17. In a motor vehicle having an engine and a throttle for controlling the fuel supply of the engine, a control connected with the throttle and operable by the driver of the vehicle, and an automatic control dependent on the speed of the engine for causing the fuel supply to be sufficient under varying load conditions for substantially maintaining a predetermined speed, said automatic control including an automatic speed regulator, means for driving said regulator from the engine, means for adjusting said speed regulator whereby to adjust the same for a different predetermined speed, said means being operable by the driver of the vehicle during operation of the vehicle, and means operative during operation of the vehicle for connecting said regulator with said throttle to render the fuel supply at speeds up to the predetermined speed dependent upon the speed regulator.

18. In a motor vehicle having an engine and a throttle for controlling the fuel supply of the engine, an accelerator pedal operatively connected with the throttle, an automatic throttle control for automatically controlling the fuel supply in accordance with the engine speed to enable a practically constant predetermined speed to be maintained regardless of load conditions, said control including an automatic speed regulator, and means for driving said regulator from the engine, a releasable connection between said regulator and throttle, and means including a brake pedal for breaking said connection during operation of the vehicle.

19. In a motor vehicle having an engine and a throttle for controlling the fuel supply of the engine, an accelerator pedal operatively connected with the throttle, an automatic throttle control for automatically controlling the fuel supply in accordance with the engine speed to enable a practically constant predetermined speed to be maintained regardless of load conditions, said control including an automatic speed regulator, and means for driving said regulator from the engine, a releasable connection between said regulator and throttle, means operable by said accelerator pedal for making said connection during operation of the vehicle, and means including a brake pedal for breaking said connection during operation of the vehicle.

20. In a motor vehicle having an engine and a throttle for controlling the fuel supply of the engine, a control including an accelerator pedal connected with the throttle, an automatic control including an engine driven automatic speed regulator also connected with the throttle for automatically adjusting the fuel supply to amounts sufficient for enabling a practically constant predetermined speed to be maintained regardless of load conditions, means for permitting said throttle to be operated by said first mentioned control at speeds above the predetermined speed, and means operative during operation of the vehicle for disconnecting said automatic control from said throttle and rendering the control of the fuel supply dependent at all speeds upon said first mentioned control, said last mentioned means also being operative during operation of the vehicle to reconnect said automatic control with said throttle for rendering the supply at all speeds up to the predetermined speed dependent upon said automatic control and at speeds above the predetermined speed upon said first mentioned control.

MARCUS T. LOTHROP.